(12) United States Patent
Seitz et al.

(10) Patent No.: US 6,631,736 B2
(45) Date of Patent: Oct. 14, 2003

(54) DEVICE FOR METERING A GASEOUS MEDIUM

(75) Inventors: Joachim Seitz, Neu-Ulm (DE); Jochen Sang, Kirchheim/Teck (DE)

(73) Assignee: Ballard Power Systems AG, Kirchheim-Nabern (DE)

( * ) Notice: Subject to any disclaimer, the term of this patent is extended or adjusted under 35 U.S.C. 154(b) by 0 days.

(21) Appl. No.: 09/910,003

(22) Filed: Jul. 23, 2001

(65) Prior Publication Data

US 2002/0043288 A1 Apr. 18, 2002

(30) Foreign Application Priority Data

Jul. 22, 2000 (DE) .......................... 100 35 763

(51) Int. Cl.[7] .............................................. F16K 11/20
(52) U.S. Cl. ...................................... 137/883; 137/884
(58) Field of Search ................................. 137/883, 884

(56) References Cited

U.S. PATENT DOCUMENTS 3,589,387 A * 6/1971 Raymond ................... 137/261
3,698,432 A * 10/1972 Kutz .......................... 137/884
4,988,580 A    1/1991 Ohsaki et al.
5,232,007 A *  8/1993 Martin ......................... 137/15
6,374,861 B1 * 4/2002 Johnson ...................... 137/883

FOREIGN PATENT DOCUMENTS

| DE | 24 60 295 | * 7/1976 | ............... 137/884 |
| DE | 19947254 | 4/2001 | |
| GB | 1343679 | 1/1974 | |
| WO | WO 94/16252 | 7/1994 | |

* cited by examiner

Primary Examiner—John Fox
(74) Attorney, Agent, or Firm—Seed IP Law Group PLLC

(57) ABSTRACT

A device is used to meter a gaseous medium, in particular air, by means of a plurality of metering valves, into a plurality of components of a fuel cell system used in a motor vehicle. All of the metering valves are arranged on a central middle block. The central middle block has at least one inlet opening for the gaseous medium, which is connected, via at least one passage, to in each case one connection point for each of the metering valves.

9 Claims, 3 Drawing Sheets

DEVICE FOR METERING A GASEOUS MEDIUM

BACKGROUND AND SUMMARY OF INVENTION

This application claims the priority of German application No. 100 35 763.6, filed Jul. 22, 2000, the disclosure of which is expressly incorporated by reference herein.

The present invention relates to a device for metering a gaseous medium, in particular air.

The general prior art has disclosed motor vehicles with fuel cell systems which supply at least part of the energy required in the motor vehicle. In particular, one should mention fuel cell systems which generate the hydrogen-containing gas required for operation of the fuel cell from a hydrocarbon in the fuel cell system itself. These gas generation systems have numerous individual components, of which purely by way of example oxidation stages, reforming reactors and shift stages should be mentioned at this point.

Many of the components of a fuel cell system of this type, in particular with an integrated gas generation system, require a metered supply of gaseous media, in particular of air or another oxygen-containing gas, to supply oxygen for the chemical and electrochemical operations in the fuel cell system.

Since this metered supply of gaseous media generally has to take place very precisely and at a controlled time into the appropriate component of the fuel cell system, a fuel cell system of this type usually has a dedicated metering valve for each of the components. These metering valves, which, by way of example, use a Laval nozzle element and a nozzle needle to allow a targeted, controllable metering of gaseous media, are assigned to the respective component. Determining the most important variables, for example upstream of the metering valve, provides the measured values which are required in order to control the metering valves by means of suitable software.

If a fuel cell system of this type is now fitted in a motor vehicle, the drawback arises that a metering valve is arranged on each of numerous components. These metering valves must in each case be provided with suitable sensor and cabling means and suitable lines for supplying it with the gaseous medium, which is generally been compressed beforehand. On account of the often very restricted spatial conditions which are present when the system is installed in a motor vehicle, this represents a considerable drawback and leads to a very high degree of outlay regarding the line elements which need to be laid for the purpose of guiding the compressed, gaseous medium from a compressor unit or the like to the metering valves. Moreover, there is a considerable drawback in terms of the laying and the required line lengths of the corresponding sensors which would have to be assigned to each of the metering valves.

Further drawbacks arise with regard to the thermal load on the metering valves. Since the metering valves are in each case arranged close to the component in question, there are highly divergent temperature loads imposed on the individual metering valves. For example, a metering valve which is arranged in the region of the gas generation system will experience a far higher thermal load than a metering valve arranged in the region directly upstream of the fuel cell. When using metering valves of identical design, this leads to different levels of thermal expansion of the elements of the individual metering valves and therefore to a considerable control outlay, since when these metering valves, which are of identical design but are exposed to different thermal conditions, are activated, there may be different relationships between mass throughput, control times and the electrical characteristic variables.

Therefore, the object of the invention is to provide a device for metering a gaseous medium, having a plurality of metering valves, into a plurality of components of a fuel cell system in a motor vehicle which reduces the space required and avoids differing loads, in particular thermal loads, but also loads caused by vibrations or the like, on the metering valves.

This object is achieved by the device according to the present invention.

A central middle block, on which all the metering valves are arranged, results in considerable advantages in terms of the packaging of the fuel cell system in the motor vehicle. A central arrangement of the metering valves on the middle block and the fact that they are each connected to at least one passage, which is connected to the at least one inlet opening for the gaseous medium, at their respective connection points result in a central supply system which supplies all the metering valves with the pressurized, gaseous medium. The gaseous medium is supplied, for example, via a compressor unit. The required length of line between the compressor unit and the individual metering valves which, in order to avoid pressure losses upstream of the metering valves, should have the largest possible diameter is reduced to a minimum, and the distribution takes place in the central middle block itself.

The previous complexity of laying lines with a maximum possible diameter which, if appropriate, additional measurement lines of the sensor arrangement positioned in the vicinity of the metering valves, lead to large amounts of space being taken up and caused a "chaotic" arrangement of lines in the fuel cell system. By contrast, in the device according to the present invention, in which all the metering valves are centralized, only the lines which have a very much smaller diameter for conveying the metered medium have to be laid, and all the sensors can be concentrated in the region of the central metering device.

In addition to these considerable advantages of the device according to the present invention in terms of packaging, further advantages arise from the central arrangement of all the metering valves of the fuel cell system at one location. The fact that all the metering valves are situated within a spatially very small area means that they are exposed to approximately the same external conditions (i.e., the same temperature, the same effects from shaking and vibrations and the like) so that if the metering valves are controlled appropriately it is possible to ensure that each of the individual metering valves functions identically to the others.

Moreover, a further advantage of the device according to the present invention is that, on account of the metering valves being arranged centrally around the middle block, the metering valves can be installed, for example, in a position within the fuel cell system which is highly advantageous for any maintenance which may be required on the metering valves.

In an embodiment of the present invention, sensors that can be used to detect variables of the gaseous medium are arranged in the at least one passage.

This has the advantage that a single set of sensors for the at least one passage can be used to carry out a central measurement, so that relatively good characteristic values of the gaseous mediums supplied to the metering valve can be determined for all the metering valves used. Because the lengths of line which are present in the region of the middle block between the sensors and the respective connection points of the metering valves are only very short, there is practically no distortion of the measured variables of the gaseous medium supplied.

Other objects, advantages and novel features of the present invention will become apparent from the following detailed description of the invention when considered in conjunction with the accompanying drawings.

DETAILED DESCRIPTION OF DRAWINGS

Figure 1:
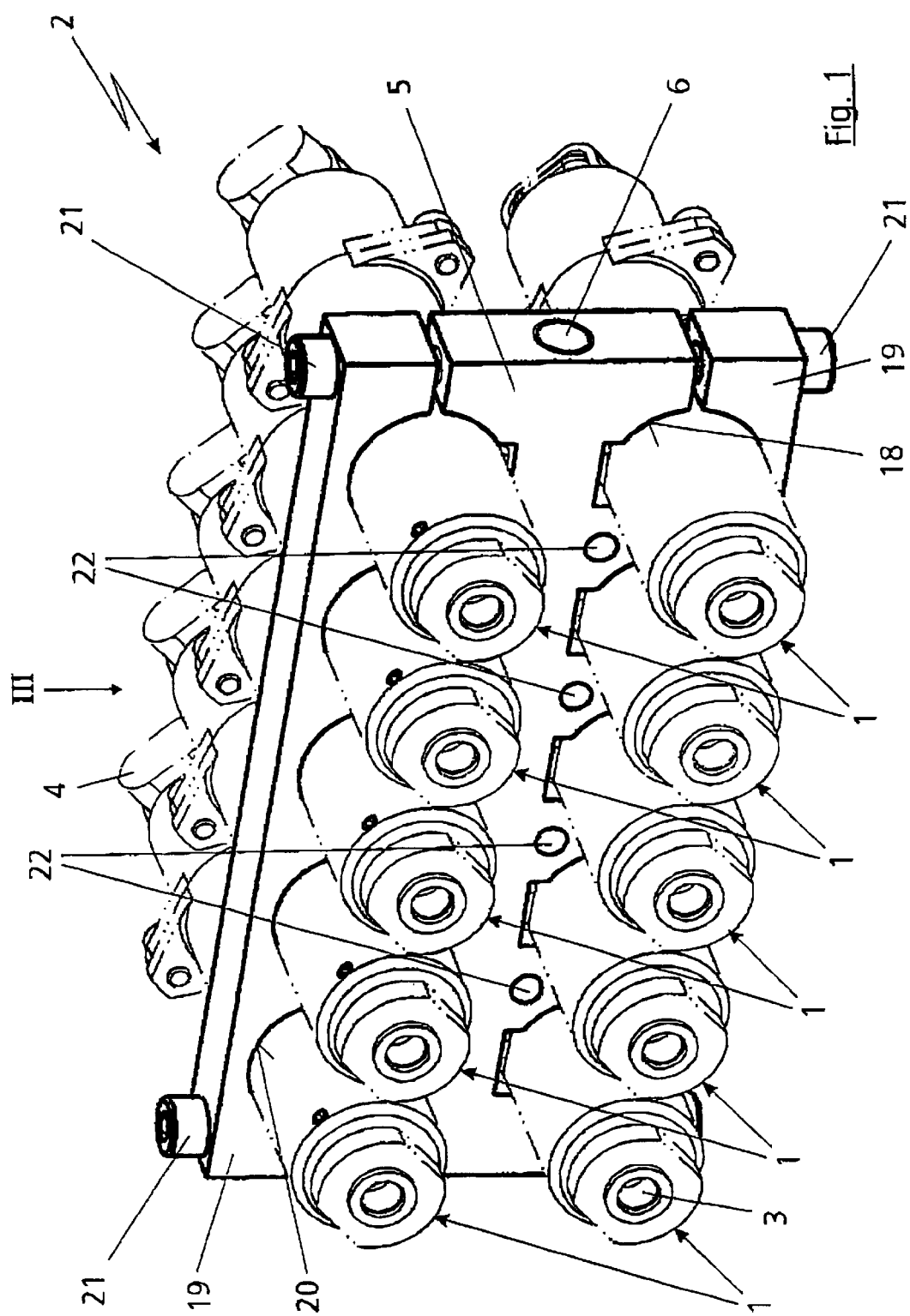
FIG. 1 shows a design of the device according to the present invention with metering valves in a three-dimensional illustration.

FIG. 1 shows a structure of a device with metering valves 1, these valves being known per se, with ten such valves being combined to form a central metering unit 2 in the embodiment illustrated in FIG. 1.

Naturally, other structures of the metering unit 2, for example with more or fewer metering valves 2, would also be conceivable. An appropriate design of a metering unit 2 of this type would, for example, be a metering unit 2 with three metering valves 1, which would then in each case be arranged at intervals of, for example, 90° with respect to one another. The remaining fourth connection could then be closed off by a blind stopper.

Naturally, variations to the metering unit 2 illustrated in FIG. 1 are also conceivable, for example one or more of the metering valves 1 could be omitted, in which case this metering valve 1 would simply be replaced by a blind stopper.

The way in which the individual metering valves 1 function will not be explained in more detail here, since this is known in principle and has no further effect on the structure according to the present invention. Each of the metering valves 1 has an outlet opening 3, through which the metered volumetric flow of the gaseous medium is released and from which it can be guided, via the line elements (not shown) of relatively small diameter, to the respective components of the fuel cell system. To actuate the metering valves 1, each of these metering valves 1 has an electrical plug connection 4, by means of which it can be connected to the corresponding electronics for controlling the metering valve 1 or the metered quantity, for example by an electromagnetic or electromechanical actuator.

A central middle block 5 forms the central functional element of the metering unit 2. Via an inlet opening 6, the gaseous medium passes from a compressor or the like (not shown), via a line element, which is likewise not shown, into the central middle block 5. In the middle block 5 there is a passage 7 which connects the inlet opening 6 to the connection point 8 for the respective metering valves 1.

Figure 2:
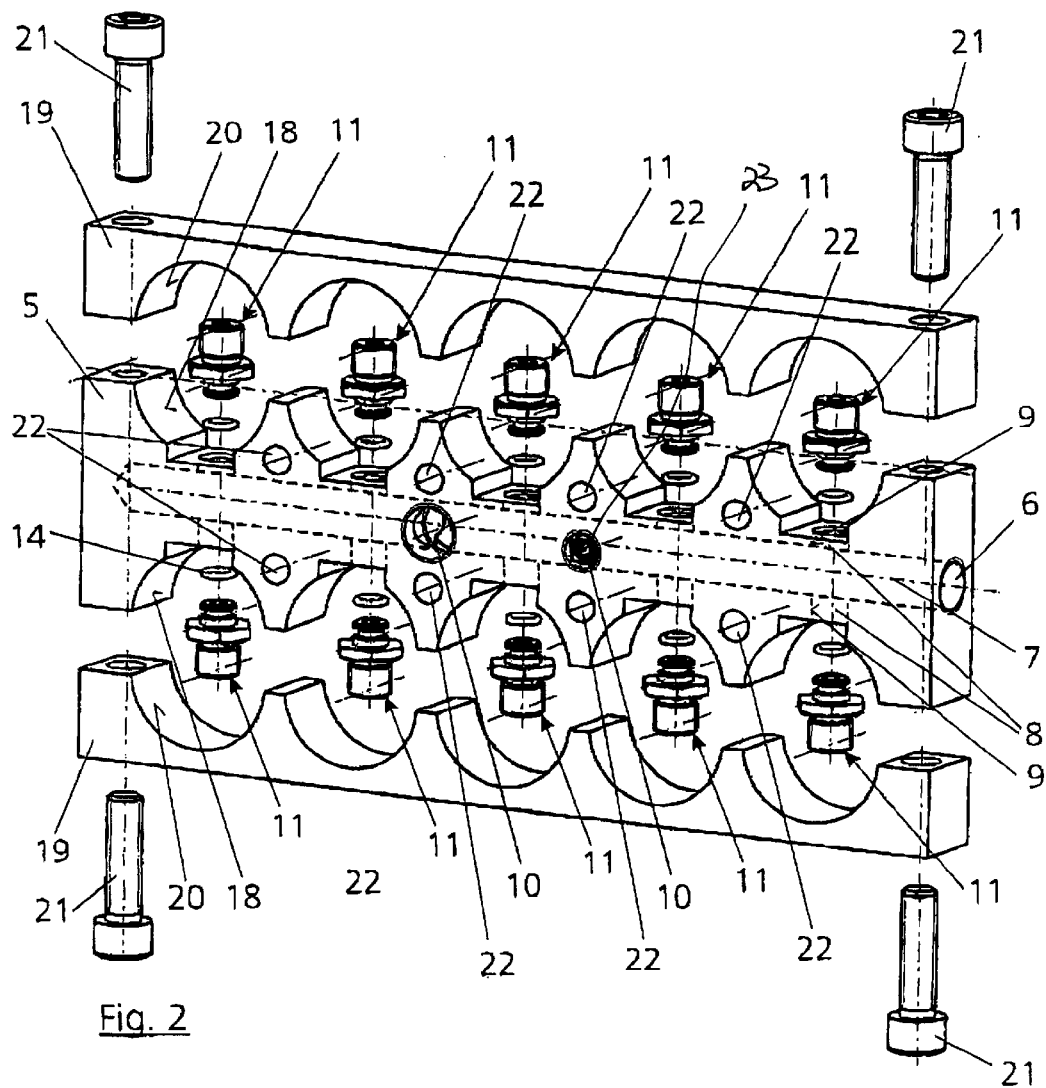
FIG. 2 shows an exploded view of a central middle block, with bridge elements and connection elements.

This structure can be understood even more clearly in the exploded illustration shown in FIG. 2, in which, for the sake of simplicity, the metering valves 1 are not illustrated. The inlet opening 6 to which the passage 7, which is indicated by dashed lines, is connected can be seen in the central middle block 5. The connection points 8, which are likewise indicated by dashed lines, for the respective metering valves 1 are in this case produced via bores 9 which run transversely with respect to the passage 7.

In addition, the middle block 5 has two centrally arranged openings 10, into which sensors 23 for detecting the variables of the gaseous medium upstream of the metering valves 1, in this case in particular pressure and temperature, can be inserted.

FIG. 2 also shows connection elements 11 for the metering valves 1. The precise structure of these connection elements 11 is described below, and the corresponding reference numerals are only given for the first time in FIG. 5 for reasons of clarity. On their side which faces the middle block 5, the connection elements 11 have a cylindrical formation 12, which is provided with a groove 13 for a seal 14, in this case an O-ring seal 14. That side of the connection element 11 which is remote from the middle block 5 has a screwthread 15 which is screwed into a corresponding inlet opening 16 of each metering valve 1. To facilitate this screwing-in operation by means of a suitable tool, each of the connection elements 11 also has a region 17 which is formed as a hexagon.

Then, when assembling the metering unit 2, the metering valves 1, which have already been screwed to the connection elements 11, can be inserted, by the cylindrical formation 12 of the connection elements, into the bores 9 of the connection points 8. The metering valves 1 come to bear at least partially in a positively-locking manner against cutouts 18, which are in the form of segments of a circle, in the middle block 5. Then, a bridge element 19, which likewise has cutouts 20 in the form of segments of a circle, is laid on top of the individual metering valves and is then connected to the middle block 5 by attachment means 21, in this case two screws 21. In this case too, the cutouts 20 in the bridge element 19, which are in the form of segments of a circle, come to bear in a positively-locking manner against the metering valves 1. A similar procedure also takes place on the opposite side of the middle block 5, so that in an exemplary embodiment as shown in FIGS. 1 and 2 ten of the metering valves 1 are then combined to form the metering unit 2.

Figure 3:
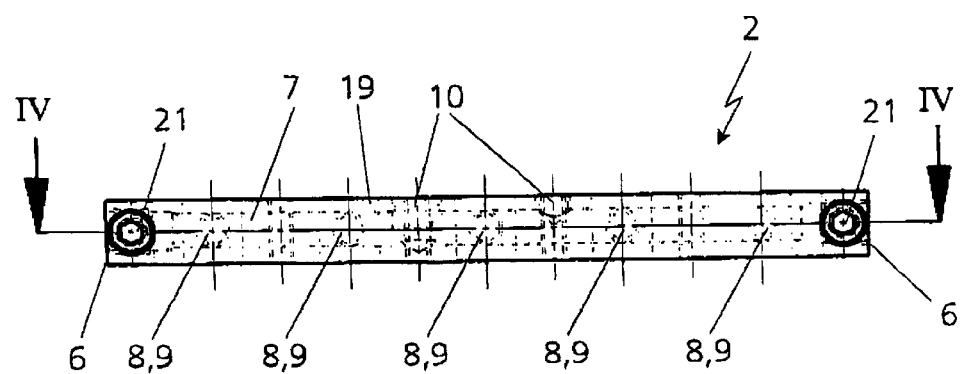
FIG. 3 shows a plan view of the device according to the present invention in the direction of arrow III in FIG. 1, without the metering valves.

In FIG. 3, it is possible to see a plan view in the direction of arrow III in FIG. 1 of the metering unit 2. In this FIG. 3 the metering valves 1 are not illustrated. In this figure, the elements which have already been mentioned in FIG. 1 and FIG. 2 are in each case provided with the same reference numerals.

Figure 4:
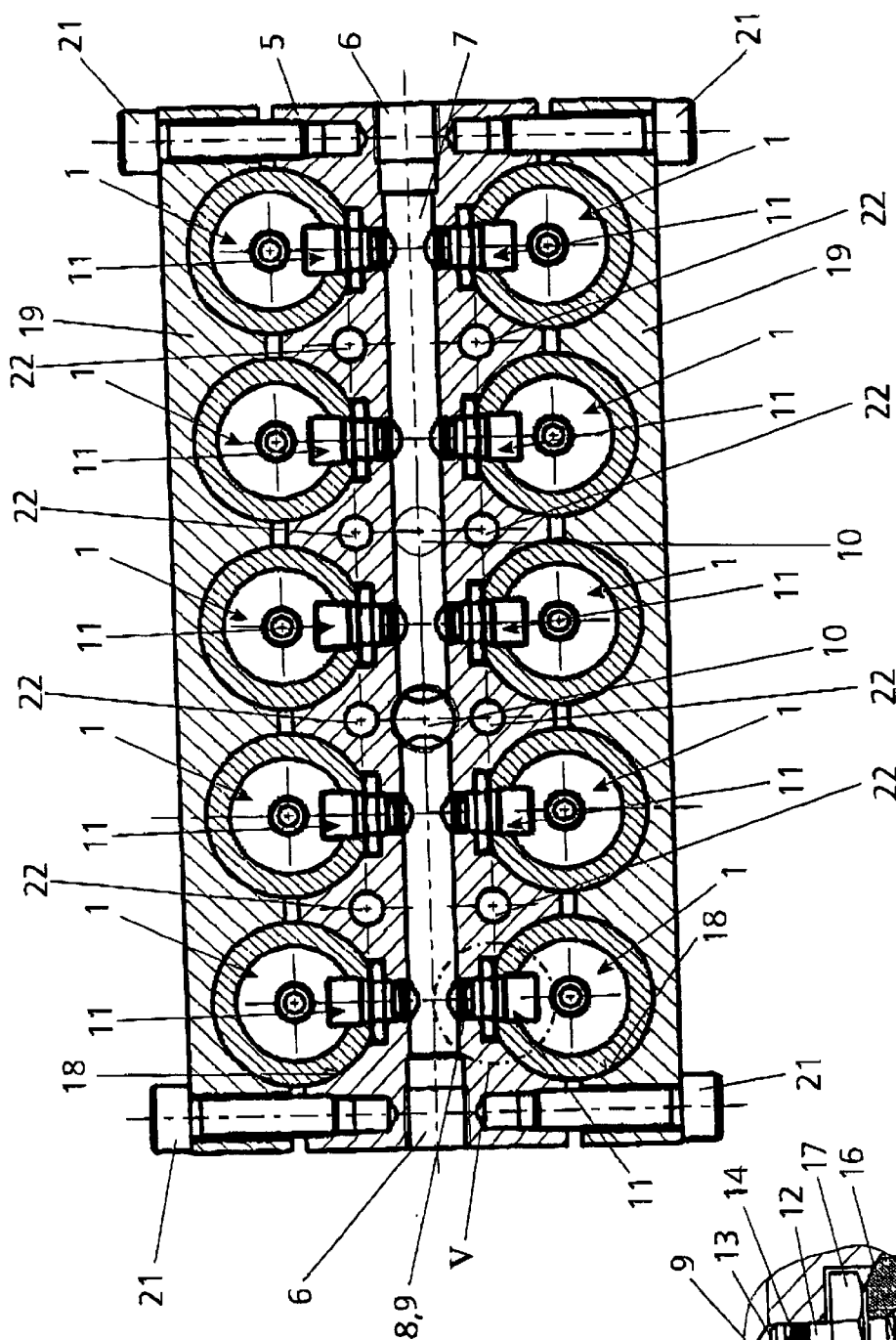
FIG. 4 shows a cross section on line IV—IV from FIG. 3.

FIG. 4 shows a cross section through this structure illustrated in FIG. 3, with the metering valves 1 are illustrated in cross section, in order for the interaction between metering valves 1 and connection elements 11 to be explained in more detail.

In this figure, only the components which have already been described and provided with the corresponding reference numerals can be seen once again. However, the structure shown in FIG. 4 has a second inlet opening 6 into the passage 7, so that in this case, by way of example, the gaseous medium can be supplied from both sides, or the side which is more favourable for packaging purposes can be selected, in which case the other inlet opening 6 then has to be closed off by means of a blind stopper (not shown).

Moreover, in FIG. 4 it is possible to see the attachment bores 22, which have not yet been explained, which run through the central middle block 5 and have no functional relationship with the metering unit 2, but rather simply serve to attach the middle block 5 to corresponding support elements of the fuel cell system or vehicle.

Figure 5:
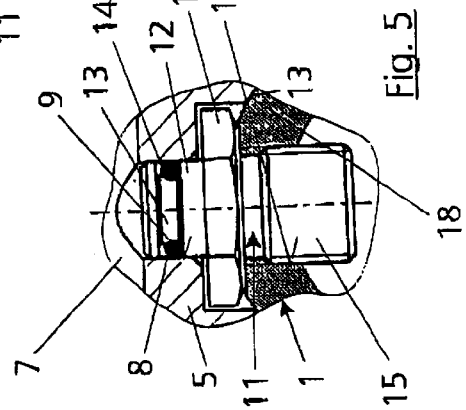
FIG. 5 shows an enlarged illustration of detail V from FIG. 4.

FIG. 5 shows an enlarged illustration of the detail V from FIG. 4, providing a further illustration of the precise structure of the connection elements 11. As has already been described, on their side which faces the middle block 5, these elements have the cylindrical formation 12 which can easily be produced, for example, from a standard connection element which has two screwthreads and the region which is formed as a hexagon 17, by removing one screwthread by turning. Then, during this turning operation, it is also possible for the groove 13 to be formed in the cylindrical formation 12 by turning, this groove then accommodating the seal 14, for example an O-ring seal 14. Otherwise, reference is at this point made once again to the structure and function of the connection element 11 which have already been explained above with regard to assembly of the metering valves 1 in the middle block 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for metering a gaseous medium, said apparatus comprising:
   a) a central mounting block, said mounting block comprising
      i) a substantially planar member having oppositely disposed major surfaces, wherein, on opposite edges of said member, a plurality of cutouts project into said major surfaces, forming mounting receptacles for metering valves, and
      ii) one gas flow passage for guiding a flow of gaseous medium to metering valves to be mounted to the central mounting block; and
   b) a bridge element for mounting metering valves in locking engagement with the central mounting block, said bridge element comprising a substantially planar member having oppositely disposed major surfaces, wherein, on an edge of said member, a plurality of cutouts project into said major surfaces, forming mounting receptacles for metering valves.

2. The apparatus of claim 1, wherein the cutouts, projecting into the major surfaces of the central mounting block and projecting into the major surfaces of the bridge element, form a configuration corresponding to an external body configuration of metering valves to be mounted to the central mounting block.

3. The apparatus of claim 1, wherein the central mounting block comprises an opening extending through one major surface of the central mounting block to the gas flow passage, said opening being adapted to receive a sensor for monitoring a parameter of the gaseous medium in the gas flow passage.

4. The apparatus of claim 2, wherein the parameter monitored is pressure or temperature.

5. The apparatus of claim 2, wherein the cutouts, projecting into the major surfaces of the central mounting block and projecting into the major surfaces of the bridge element, form a configuration corresponding to an external body configuration of metering valves to be mounted to the central mounting block.

6. The apparatus of claim 2, wherein the central mounting block comprises an attachment bore extending through the oppositely disposed major surfaces of the central mounting block, for attaching the central mounting block to a support element.

7. The apparatus of claim 6, wherein the cutouts, projecting into the major surfaces of the central mounting block and projecting into the major surfaces of the bridge element, form a configuration corresponding to an external body configuration of metering valves to be mounted to the central mounting block.

8. Apparatus for metering a gaseous medium to a plurality of remotely situated gas consuming devices, said apparatus comprising:
   a central mounting block; and
   a plurality of metering valves mounted on said central mounting block, each of said metering valves being connectable to deliver said gaseous medium to a different one of said gas consuming device; wherein
      said central mounting block has at least one gas flow passage for guiding a flow of gas which is to be metered individually to each of said gas consuming devices;
      said central mounting block comprises a substantially planar member having oppositely disposed major surfaces, and having on opposite edges thereof a plurality of cutouts which project into said major surfaces, forming mounting receptacles for said metering valves;
      the projection of said mounting receptacles into said major surfaces forms a configuration that corresponds to an external body configuration of said metering valves, for mounting of said metering valves in locking engagement in said receptacles; and
      each of said mounting receptacles includes a coupling for connecting the metering valve mounted therein with the gas flow passage.

9. The apparatus according to claim 8, wherein said coupling comprises a connection element having a central bore for providing fluid flow communication between said gas flow passage and a metering device mounted in one of said mounting receptacles, said connection element having a threaded end portion for connection to said metering device and an opposite end portion for gas tight frictional engagement with a bore which communicates with said gas flow passage.

* * * * *